March 24, 1970 E. GEISSLER 3,503,046

COMMAND MODIFYING CIRCUIT OF A DATA PROCESSING SYSTEM

Filed April 28, 1967 5 Sheets-Sheet 2

March 24, 1970 E. GEISSLER 3,503,046

COMMAND MODIFYING CIRCUIT OF A DATA PROCESSING SYSTEM

Filed April 28, 1967 5 Sheets-Sheet 3

March 24, 1970 E. GEISSLER 3,503,046

COMMAND MODIFYING CIRCUIT OF A DATA PROCESSING SYSTEM

Filed April 28, 1967 5 Sheets-Sheet 4

United States Patent Office 3,503,046
Patented Mar. 24, 1970

3,503,046

COMMAND MODIFYING CIRCUIT OF A DATA PROCESSING SYSTEM

Ernst Geissler, Bielefeld, Germany, assignor to Anker-Werke AG, Bielefeld, Germany, a corporation of Germany Filed Apr. 28, 1967, Ser. No. 634,513
Claims priority, application Germany, Apr. 30, 1966, A 52,326
Int. Cl. G06f *1/00;* G11b *13/00*
U.S. Cl. 340—172.5 7 Claims

ABSTRACT OF THE DISCLOSURE

A plurality of AND gates are connected between the outputs of logic circuitry and the inputs of a memory and a command register of a data processing system. The AND gates selectively control the transfer of data from the logic circuitry to the memory and to the command register under the control of a bistable multivibrator in accordance with a proposed modification of a command.

DESCRIPTION OF THE INVENTION

The present invention relates to a data processing system. More particularly, the invention relates to a command modifying circuit of a data processing system. The command modifying circuit of the present invention modifies a command in the data processing system prior to its execution.

Data processing systems of the type with which the present invention is concerned are disclosed in United States Patent Nos. 3,111,648 and 3,284,778. Such known data processing systems include one or more index registers for modifying commands prior to their execution. The commands are modified by the stored contents of the index register or registers prior to their execution in a command register. In order to provide greater flexibility, a plurality of index registers are provided. An index register constitutes additional circuitry, however, so that one or more index registers create a considerable expense. The expense is further increased by a necessary additional data position on the command word for indicating the index register.

The principal object of the present invention is to provide a new and improved command modifying circuit of a data processing system. The command modifying circuit of the present invention modifies commands in the command register itself and eliminates the additional index register or registers of the known systems. The command modifying circuit of the present invention eliminates the need for identifying the command to be modified since it modifies the next-following command. The command modifying circuit of the present invention permits the utilization of any data recorded in an input memory for modifying the command. The command modifying circuit of the present invention permits the modification of any desired position in a command register and the modification of any desired number of positions in the command register. The command modifying circuit of the present invention is of simple structure and is efficient, effective, reliable and inexpensive in operation.

In accordance with the present invention, a highly variable modification of commands is provided prior to their execution in the command register of a data processing system without the assistance of additional index or auxiliary registers. This is due to the fact that in order to load the arithmetic register, any memory cell of the main core memory may be controlled for the purpose of receiving a modified term of a sum. Data supplied to the arithmetic register of the data processing system modifies the command and a command is supplied to the arithmetic register to modify the next-following command. Any data recorded in an accumulator may be supplied to the arithmetic register for modifying the command. The transfer of data stored in the arithmetic register and computed in the logic circuitry is selectively controlled from the logic circuit to one of the accumulator and the command registers of the data processing system in accordance with a proposed modification of the command. The data is prevented from transfer to the accumulator and is transferred to the command register when the command is to be modified.

In accordance with the present invention, a command modifying circuit is included in a data processing system having a command register, an arithmetic register having outputs, logic circuitry having outputs and inputs connected to the outputs of said arithmetic register and an accumulator having inputs. The command modifying circuit comprises gates connected between the outputs of the logic circuitry and the inputs of the accumulator and the command register for selectively controlling the transfer of data from the logic circuitry to the accumulator and to the command register. A control unit is connected to the gates for operating the gates in accordance with a proposed modification of a command. The gates comprise AND gates having inputs and outputs. Selected ones of the inputs are connected to the outputs of the logic circuitry and the others of the inputs are connected to the control unit. Selected ones of the outputs are connected to the accumulator and the others of the outputs are connected to the command register. The gates comprise a first plurality of AND gates each having an input connected to a corresponding output of the logic circuitry, an input connected to the control unit and an output connected to a correspoding input of the command register, and a second plurality of AND gates each having an input connected to a corresponding output of the logic circuitry, an input connected to the control unit and an output connected to a corresponding input of the accumulator. The control unit comprises a bistable multivibrator having a set output and a reset output, one of the set and reset outputs being connected to an input of each AND gate of the second plurality of AND gates and the other of the set and reset outputs being connected to an input of each AND gate of the first plurality of AND gates.

In order that the present invention may be readily carried into effect, it will now be described with reference to the accompanying drawings, wherein.

Figure 1:
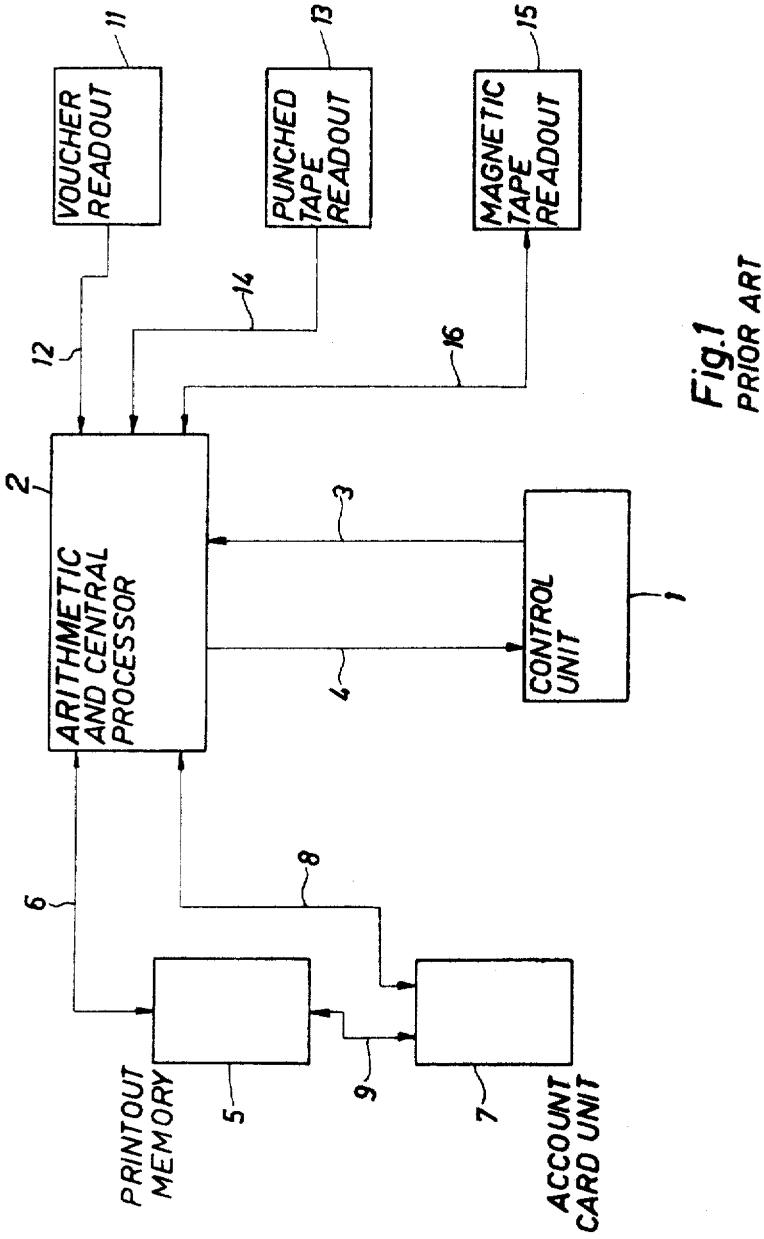
Fig.1 PRIOR ART
FIG. 1 is a block diagram of a data processing system of the prior art which may utilize the command modifying circuit of the present invention.

The data processing system of FIG. 1 comprises a control unit 1. The control unit 1 is connected to an arithmetic and central processor 2 via an input lead 3 and an output lead 4. A printout accumulator 5 is connected to the arithmetic and central processor 2 via a lead 6. An account card unit 7 is connected to the arithmetic and central processor 2 via a lead 8 and to the printout accumulator 5 via a lead 9.

A voucher readout 11 is connected to the arithmetic and central processor 2 via a lead 12. A punched tape readout 13 is connected to the arithmetic and central processor 2 via a lead 14. A magnetic tape readout 15 is connected to the arithmetic and central processor 2 via a lead 16.

The arithmetic and central processor 2 functions in known manner to operate on data supplied by one or a combination of the voucher readout 11, the punched tape readout 13 and the magnetic tape readout 15 under the control of the control unit 1. The results of the operation, computation, processing or the like are recorded in known manner by the printout accumulator 5 or the account card unit 7, or both. Each of the units 1, 2, 5, 7, 11, 13 and 15 is a known unit and functions in a known manner.

Figure 2:
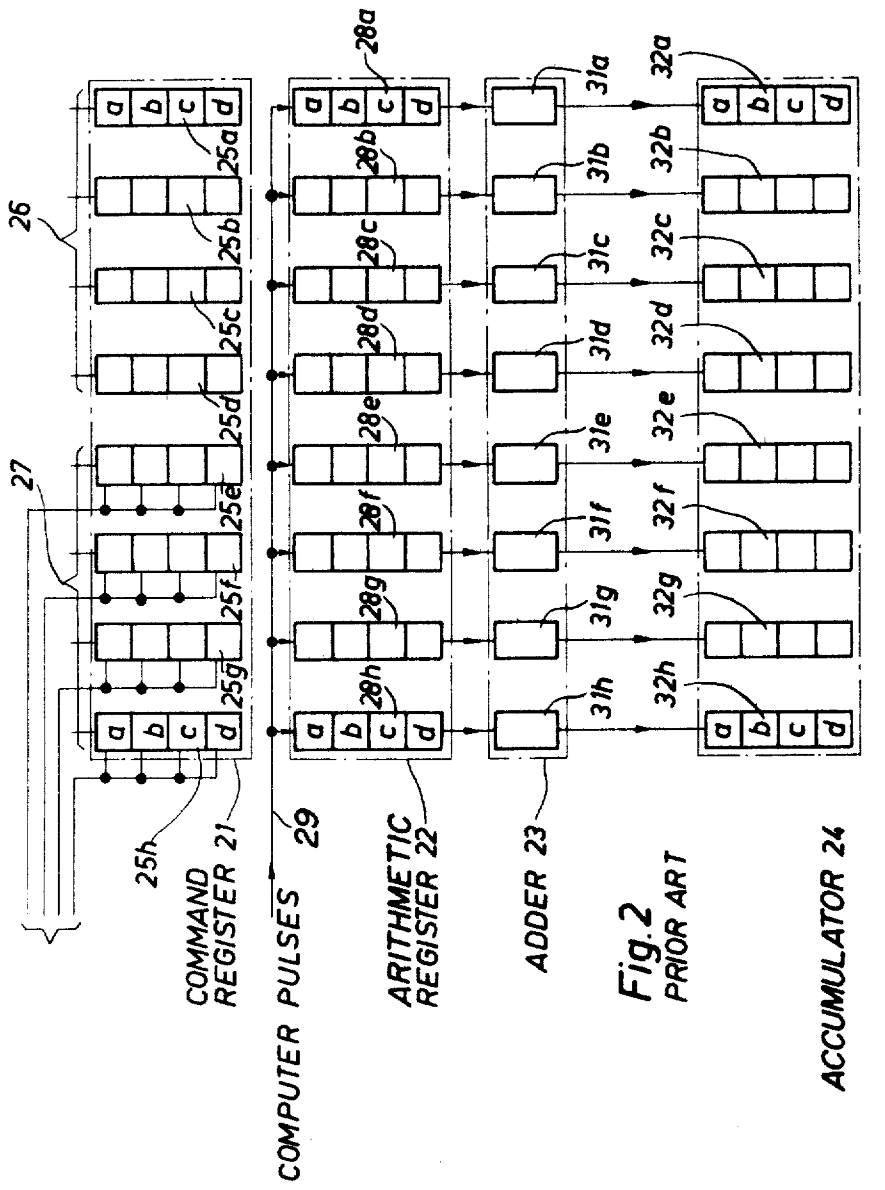
Fig.2 PRIOR ART
FIG. 2 is a block diagram of part of the arithmetic and central processor of the prior art processing system of FIG. 1.
Figure 4:
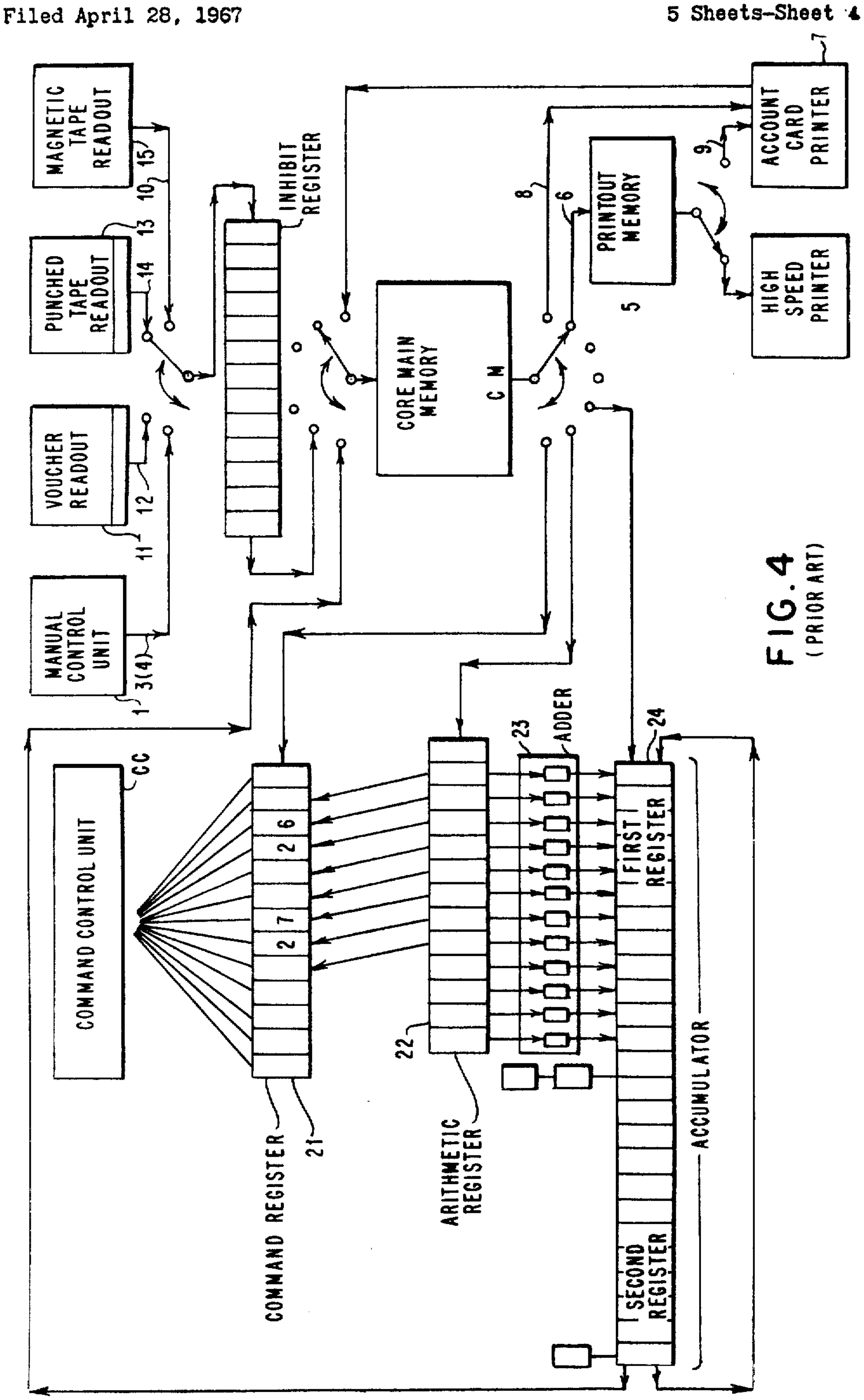
FIG. 4 (PRIOR ART)
FIG. 4 is a block diagram showing components of the arithmetic and central processor of FIG. 1.

In FIG. 4, there are shown in block diagram the components of the arithmetic and central processor 2 of FIG. 1. They include a command control unit CC a command register 21, an arithmetic register 22, an adder 23, an accumulator 24, formed of a first and a second register, and a core main memory CM with an inhibit register operatively connected to one another by suitable lines that are not further illustrated except by one line in FIG. 4. The command register 21, having thirteen counters or counter stages, for example, includes eight counters 25*a*, 25*b*, 25*c*, 25*d*, 25*e*, 25*f*, 25*g*, and 25*h* (FIG. 2) of which four of the counters 25*a*, 25*b*, 25*c* and 25*d* constitute an operand addressing portion 26 (FIG. 4) for receiving the address for the subsequent command, and the other four of the counters 25*e*, 25*f*, 25*g* and 25*h* constitute an operand command portion 27 (FIG. 4) for receiving the command that is to be carried out.

The arithmetic register 22 comprises a plurality such as, for example, 8, of counters or counter stages 28*a*, 28*b*, 28*c*, 28*d*, 28*e*, 28*f*, 28*g* and 28*h*. Each counter stage 28*a* to 28*h* of the arithmetic register 22 has an input connected to an input lead 29 which supplies arithmetic signals or pulses to said counter stages and each of said counter stages has an output. The output of each counter stage 28*a* to 28*h* of the computer register 22 is connected to the input of a corresponding one of the logic or adder stages 31*a*, 31*b*, 31*c*, 31*d*, 31*e*, 31*f*, 31*g* and 31*h* of the adder 23.

The accumulator 24 comprises a plurality such as, for example, 8, of counters or counter stages 32*a*, 32*b*, 32*c*, 32*d*, 32*e*, 32*f*, 32*g* and 32*h*. Each of the logic stages 31*a* to 31*h* of the adder 23 has an output connected to the input of a corresponding one of the counter stages 32*a* to 32*h* of the accumulator 24. The connections between the computer register 22 and the accumulator 24 for tens transfer, polarity or sign determination and shift pulse transfer are not shown in FIG. 2 in order to maintain the clarity of illustration.

Each counter stage 25*a* to 25*h* of the command register 21, 28*a* to 28*h* of the computer register 22 and 32*a* to 32*h* of the accumulator 24 comprises four bistable multivibrators or flip flops *a* to *d* which store the digits *k*0 to *k*9 in a binary fashion such as, for example, 1, 2, 4, 2.

Figure 5:
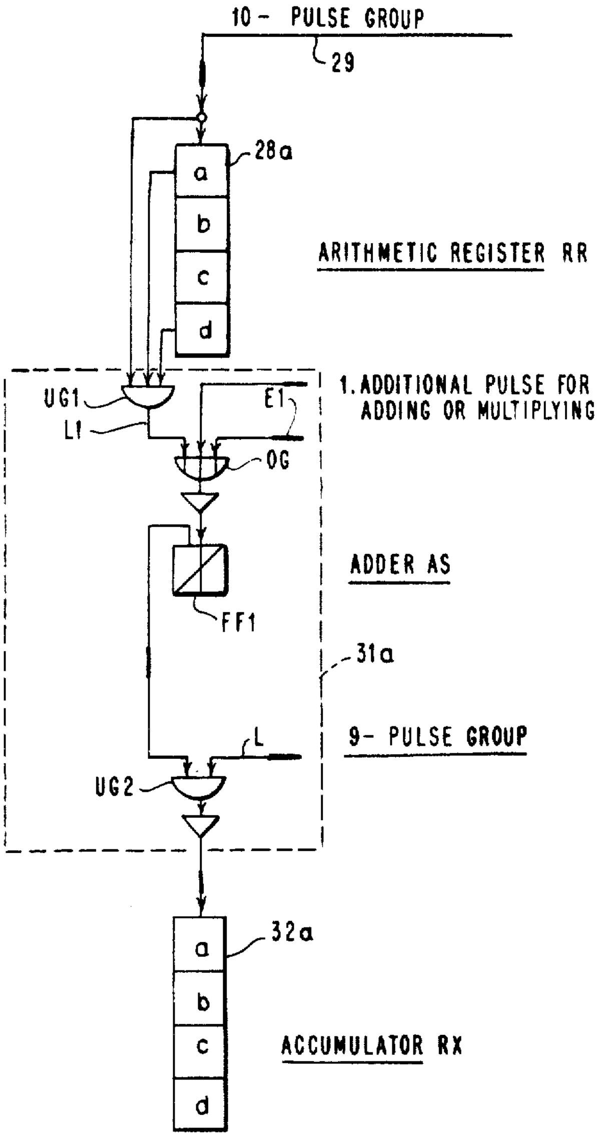
FIG. 5 (PRIOR ART)
FIG. 5 is a block diagram of part of the system of FIG. 2 showing components of one of the adder stages.

FIG. 5 is a circuit diagram of an embodiment of the adder 23 of the circuit of the present invention. During the adding process, the number *x* stored in a counter or register stage 28*a* of the arithmetic register RR is transmitted to the corresponding counter or register stage 32*a* of the accumulator RX and is added to the number *y* stored therein. If, for example, a 3 is in the counter stage 28*a* and a 5 is in the counter stage 32*a*, 10 counting pulses will be available on the conductor 29 of the arithmetic register stage 28*a*, while only 9 counting pulses can reach an AND gate UG2 via a conductor L leading in to the register stage 32*a*. The first of these pulses and the second pulse are adjacent to the 10 pulse group supplied via a conductor L1.

The AND gate UG2 is initially maintained in its nonconductive condition by the flip flop FF1. After 7 pulses, the register stage 28*a* is at zero and has set the bistable multivibrator or flip flop FF1 via an AND gate UG1 and an OR gate OG. The 3 pulses which are still missing from the 10 pulse group return the register stage 28*a* of the arithmetic register RR to its initial condition 3. Since the flip flop FF1 and the AND gate UG2 are in their conductive condition, the remaining 3 pulses of the 9 pulse group are supplied to the register stage 32*a* of the accumulator RX. These pulses are added to the number 5 which is already in the register stage 32*a*. The result is the number 8. Subsequently, the flip flop FF1 is switched to its reset condition by an additional pulse via an input lead E1.

Figure 3:
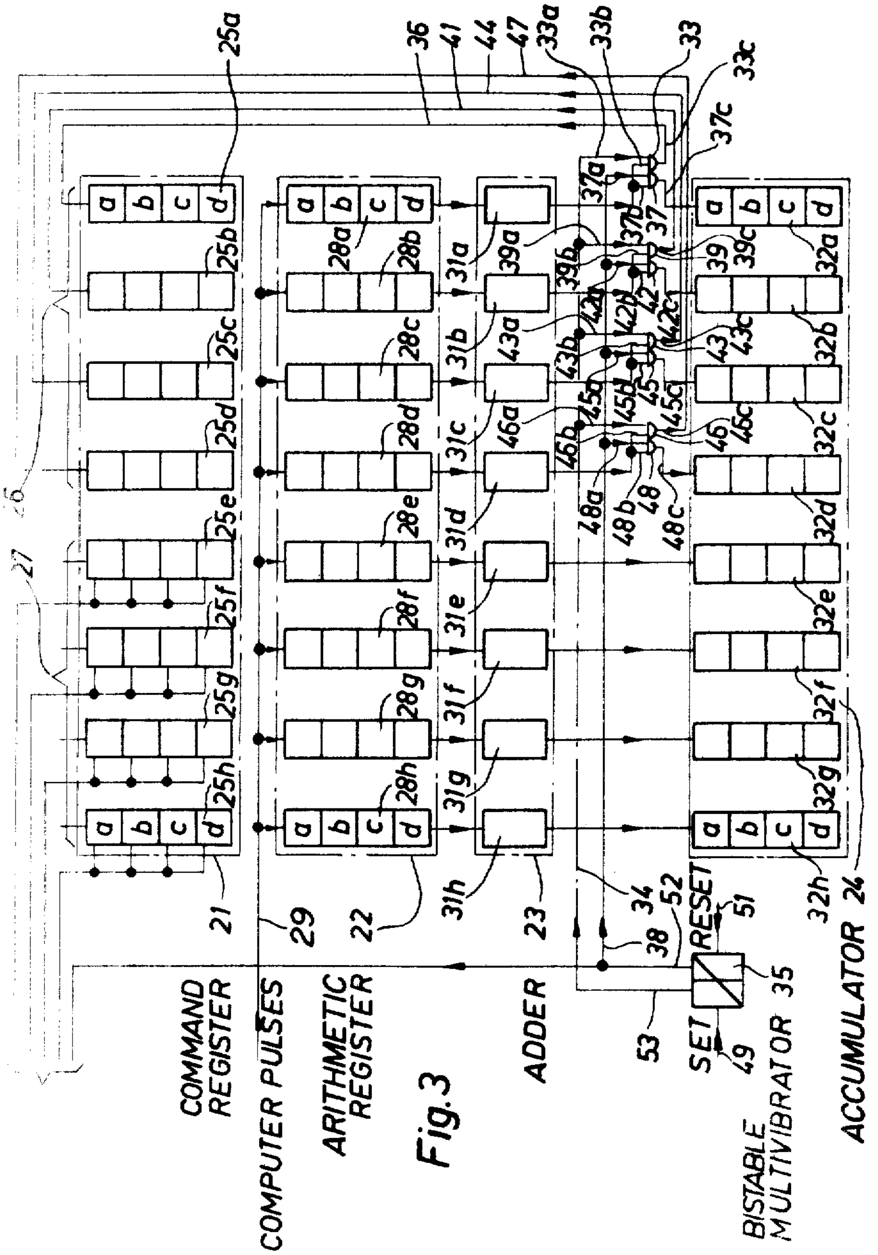
FIG. 3 is a block diagram of an embodiment of the command modifying circuit of the present invention as utilized in the data processing system of FIGS. 1 and 2.

FIG. 3 illustrates the command modifying circuit of the present invention as it is utilized in a data processing system. The data processing system of FIG. 3 comprises the command register 21, the arithmetic register 22, the adder 23 and the accumulator 24 of the data processing system of FIG. 2 and the same components of both systems are identified by the same reference numeral.

In accordance with the present invention, a plurality of AND gates and a bistable multivibrator or flip flop are provided in cooperative relation between the logic stages 31*a*, 31*b*, 31*c* and 31*d* of the adder 23 and the counter stages 32*a*, 32*b*, 32*c* and 32*d* of the accumulator 24 and the counter stages 25*a*, 25*b*, 25*c* and 25*d* of the command register 21. Thus, a first AND gate 33 has a first input 33*a* connected via a lead 34 to one of the set and reset outputs of a bistable multivibrator or flip flop 35. The first AND gate 33 has a second input 33*b* connected to the output of the adder stage 31*a* of the adder 23 and an output 33*c* connected to the input of the first counter stage 25*a* of the command register 21 via a lead 36.

A second AND gate 37 has a first input 37*a* connected via a lead 38 to the other of the set and reset outputs of the flip flop 35. The second AND gate 37 has a second input 37*b* connected to the output of the first adder stage 31*a* of the adder 23 and an output 37*c* connected to the input of the first counter stage 32*a* of the accumulator 24. A third AND gate 39 has a first input 39*a* connected via the lead 34 to the one of the set and reset outputs of the flip flop 35. The third AND gate 39 has a second input 39*b* connected to the output of the second adder stage 31*b* of the adder 23 and an output 39*c* connected to the input of the second counter stage 25*b* of the command register 21 via a lead 41.

A fourth AND gate 42 has a first input 42*a* connected via the lead 38 to the other of the set and reset outputs of the flip flop 35. The fourth AND gate 42 has a second input 42*b* connected to the output of the second adder stage 31*b* of the adder 23 and an output 42*c* connected to the input of the second counter stage 32*b* of the accumulator 24. A fifth AND gate 43 has a first input 43*a* connected via the lead 34 to the one of the set and reset outputs of the flip flop 35. The fifth AND gate 43 has a second input 43*b* connected to the output of the third adder stage 31*c* of the adder 23 and an output 43*c* connected to the input of the third counter stage 25*c* of the command register 21 via a lead 44.

A sixth AND gate 45 has a first input 45*a* connected via the lead 38 to the other of the set and reset outputs of the flip flop 35. The sixth AND gate 45 has a second input 45*b* connected to the output of the third adder stage 31*c* of the adder 23 and an output 45*c* connected to the input of the third counter stage 32*c* of the accumulator 24. A seventh AND gate 46 has a first input 46*a* connected via the lead 34 to the one of the set and reset outputs of the flip flop 35. The seventh AND gate 46 has a second input 46*b* connected to the output of the fourth adder stage 31*d* of the adder 23 and an output 46*c* connected to the input of the fourth counter stage 25*d* of the command register 21 via a lead 47. An eighth AND gate 48 has a first input 48*a* connected via the lead 38 to the other of the set and reset outputs of the flip flop 35. The eighth AND gate 48 has a second input 48*b* connected to the output of the fourth adder stage 31*d* of the adder 23 and an output 48*c* connected to the input of the fourth counter stage 32*d* of the accumulator 24.

In FIG. 3, the modification of a command is accomplished via feedback to the command register through the AND gates 33, 37, 39, 42, 43, 45, 46 and 48. The control is via a programmed operand address. A set input signal is supplied to the flip flop 35 via a set input 49 and a reset input signal is supplied to the flip flop via a reset input 51. The set input signal sets the flip flop 35 and the reset input signal resets the flip flop.

During normal operation, computation or addition, the flip flop 35 is in its reset condition and provides a signal or binary negative 1 potential at its output 52, which is its reset output. The flip flop provides a zero potential or no signal at its output 53, which is its set output, when said flip flop is in its reset condition. The signal in the output 52 of the flip flop 35 is supplied via the lead 38 to the first inputs 37*a*, 42*a*, 45*a* and 48*a* of the second, fourth, sixth and eighth AND gates 37, 42, 45 and 48, respectively, so that the output signals from the first, second, third and fourth adder stages 31*a* to 31*d* of the added 23, which are supplied to the second inputs 37*b*, 42*b*, 45*b* and 48*b*, respectively, of said AND gates switch said AND gates to their conductive conditions and aid AND gates conduct said output signals to the counter stages 32*a*, 32*b*, 32*c* and 32*d*, respectively, of the accumulator 24.

Since, in the reset condition of the flip-flop 35, there is no signal provided at the set output 53 of said flip flop, there is no signal supplied to the first inputs 33*a*, 39*a*, 43*a* and 46*a* of the first, third, fifth and seventh AND gates 33, 39, 43 and 46, so that said AND gates are in their non-conductive conditions and do not conduct the output signals of the adder stages 31*a*, 31*b*, 31*c* and 31*d*.

If it is desired to modify a command, the command "Prepare Arithmetic Register For Modification" is supplied to the arithmetic register 22 and the necessary data for modifying the operand address is supplied to said computer register. As soon as the command "Prepare Computer Register for Modification is executed, the command "Set After Execution of Command By Computer Register" causes the supply of a set input signal to the flip flop 35 via the set input 49 to set said flip flop to its set condition. At the same time, the word of the command which is to be modified is supplied to the operand addressing portion 26 of the command register 21.

When the flip flop 35 is in its set condition, said flip flop provides a signal at its set output 53 and no signal at its reset output 52. This prevents the execution of the command registered in the portion 26 of the command register. The signal in the output 53 of the flip flop 35 is supplied via the lead 34 to the first inputs 33*a*, 39*a*, 43*a* and 46*a* of the first, third, fifth and seventh AND gates 33, 39, 43 and 46, respectively, so that the output signals from the first, second, third and fourth adder stages 31*a* to 31*d* of the adder 23, which are supplied to the inputs 33*b*, 39*b*, 43*b* and 46*b*, respectively, of said AND gates, switch said AND gates to their conductive conditions and said AND gates conduct said output signals to the counter stages 25*a*, 25*b*, 25*c* and 25*d*, respectively, of the command register 21.

Since, in the set condition of the flip flop 35, there is no signal provided at the reset output 52 of said flip flop, there is no signal supplied to the first inputs 37*a*, 42*a*, 45*a* and 48*a* of the second, fourth, sixth and eighth AND gates 37, 42, 45 and 48, so that said AND gates are in their non-conductive conditions and do not conduct the output signals of the adder stages 31*a* to 31*d* to the accumulator 24.

Thus, when the flip flop 35 is in its set condition, it prevents the execution of the command which is to be modified by preventing the supply of the output signals from the adder stages 31*a* to 31*d* to the accumulator 24, and initiates the modification of the command by causing the output signals from the adder stages 31*a* to 31*d* to be supplied to the command register 21.

Upon completion of the modification of the command, the command provided via the program control causes the supply of a reset input signal to the flip flop 35 via the reset input 51 to reset said flip flop to its reset condition, and said command causes the command register 21 to release to provide the modified command with the modified operand address.

The operand address may be enlarged as well as reduced. When the operand address is reduced, however, the arithmetic register 22 must be supplied with appropriate or corresponding complementary magnitudes. Any suitable memory device may be utilized to supply the arithmetic register 22 with data for modifying a command.

The command modifying circuit of the present invention, as described, thus provides a desired modification of commands, prior to the execution of the commands in the command register 21, and without utilizing additional index registers.

While the invention has been described by means of a specific example and in a specific embodiment, I do not wish to be limited thereto, for obvious modifications will occur to those skilled in the art without departing from the spirit and scope of the invention.

I claim:

1. A circuit arrangement for modifying a command in the command register of a program-controlled data processing system, comprising an arithmetic register having a plurality of inputs and a plurality of parallel outputs;

input means connected to the inputs of said arithmetic register for supplying to said register information from memory means;

a plurality of adders each connected to a corresponding one of the outputs of said arithmetic register;

a command register for receiving the command to be processed, said command register having a plurality of inputs;

an accumulator having a plurality of inputs; and program-controlled circuit means interconnecting selected ones of said adders and selected inputs of said accumulator and selected inputs of said command register for performing arithmetic operations and for sensing the command to be processed in order to perform modification operations.

2. A circuit arrangement as claimed in claim 1, wherein said command register comprises a plurality of a plurality of computer stages each of which is connected to a corresponding one of selected inputs of said command register.

3. A circuit arrangement as claimed in claim 1, further comprising a bistable multivibrator controlled by a program and connected to said circuit means for controlling said circuit means in accordance with the set condition of said multivibrator.

4. A circuit arrangement as claimed in claim 3, wherein said circuit means comprises AND gate means having inputs and outputs, selected ones of said inputs being connected to selected ones of said adders and others of said inputs being connected to said bistable multivibrator, selected ones of said outputs being connected to said accumulator and the others of said outputs being connected to said command register.

5. A circuit arrangement as claimed in claim 3, wherein said circuit means comprises a first plurality of AND gates each having an input connected to a corresponding one of said adders, an input connected to said bistable multivibrator and an output connected to a corresponding input of said command register, and a second plurality of AND gates each having an input connected to a corresponding one of said adders, an input connected to said bistable multivibrator and an output connected to a corresponding input of said accumulator.

6. A circuit arrangement as claimed in claim 5, wherein said bistable multivibrator controls in one condition of said bistable multivibrator the connection of said arithmetic register and said adders to said accumulator and controls the execution of commands registered in said command register, and said bistable multivibrator controls in the other condition of said bistable multivibrator the connection of said adders to said command register.

7. A circuit arrangement as claimed in claim 5, wherein said bistable multivibrator has a set output and a reset output, one of said set and reset output being connected to an input of each AND gate of said second plurality of AND gates and the other of said set and reset output being connected to an input of each AND gate of said first plurality of AND gates.

References Cited

UNITED STATES PATENTS

| | | | |
|---|---|---|---|
| 3,015,441 | 1/1962 | Rent et al. | 340—172.5 |
| 3,094,610 | 6/1963 | Humphrey et al. | 340—172.5 |
| 3,111,648 | 11/1963 | Marsh et al. | 340—172.5 |
| 3,144,550 | 8/1964 | Basten | 340—172.5 |
| 3,166,668 | 1/1965 | Marsh | 340—172.5 |
| 3,284,778 | 11/1966 | Trauboth | 340—172.5 |

OTHER REFERENCES

The Univac 1107 Thin-Film Memory Computer (General Description). Copyright 1961. Sperry Rand Corporation, pp. 1–11.

PAUL J. HENON, Primary Examiner

SYDNEY CHIRLIN, Assistant Examiner